United States Patent
Wood et al.

(10) Patent No.: US 7,802,413 B2
(45) Date of Patent: Sep. 28, 2010

(54) APPARATUS AND METHODS FOR REINFORCING A STRUCTURAL PANEL

(75) Inventors: Jeffrey H Wood, Eureka, MO (US); Terry A Sewell, Ballwin, MO (US)

(73) Assignee: The Boeing Company, Chicago, IL (US)

(*) Notice: Subject to any disclaimer, the term of this patent is extended or adjusted under 35 U.S.C. 154(b) by 1216 days.

(21) Appl. No.: 10/958,079

(22) Filed: Oct. 4, 2004

(65) Prior Publication Data
US 2006/0071125 A1   Apr. 6, 2006

(51) Int. Cl.
*E04C 2/38* (2006.01)
*E06B 3/00* (2006.01)

(52) U.S. Cl. ............... 52/656.5; 52/204.55; 52/208; 244/129.3

(58) Field of Classification Search ........... 52/204.55, 52/208, 656.5; 244/129.3, 129.4, 129.1
See application file for complete search history.

(56) References Cited

U.S. PATENT DOCUMENTS

| | | | |
|---|---|---|---|
| 2,293,656 A * | 8/1942 | McClain | 52/208 |
| 3,429,530 A | 2/1969 | Hertel | |
| 3,953,630 A | 4/1976 | Roberts et al. | |
| 4,799,346 A * | 1/1989 | Bolton et al. | 52/509 |
| 5,518,208 A * | 5/1996 | Roseburg | 244/132 |
| 6,067,761 A * | 5/2000 | Demeester | 52/208 |
| 6,711,861 B2 * | 3/2004 | Berger, Jr. | 52/208 |
| 7,028,950 B2 * | 4/2006 | Salmon et al. | 244/129.3 |
| 7,530,531 B2 * | 5/2009 | Wood et al. | 244/129.3 |
| 2004/0035979 A1 * | 2/2004 | McCoskey et al. | 244/117 R |
| 2004/0238690 A1 | 12/2004 | Wood et al. | |

FOREIGN PATENT DOCUMENTS

| | | |
|---|---|---|
| EP | 0597624 A1 | 5/1994 |
| EP | 1 481 892 A2 | 12/2004 |
| EP | 1481892 A2 | 12/2004 |
| JP | 2001 354781 | 12/2001 |

OTHER PUBLICATIONS

European Search Report for European Application No. EP 05 07 7258 completed Nov. 29, 2005.
European Search Report for European Application No. 05077259.9 completed Nov. 29, 2005.

* cited by examiner

*Primary Examiner*—Richard E Chilcot, Jr.
*Assistant Examiner*—Branon C Painter
(74) *Attorney, Agent, or Firm*—Harness, Dickey & Pierce, P.L.C.

(57) ABSTRACT

A structural panel includes a frame having one or more attachment members. A material injection-molded onto at least a portion of the frame fills one or more openings at least partly defined by the frame and defines at least a portion of a shape of the panel. The attachment member(s) are at least partially embedded in the injection-molded material for attaching the panel relative to the structure. Because attachment members can be embedded in this panel, little if any post-processing is needed to install the panel.

14 Claims, 5 Drawing Sheets

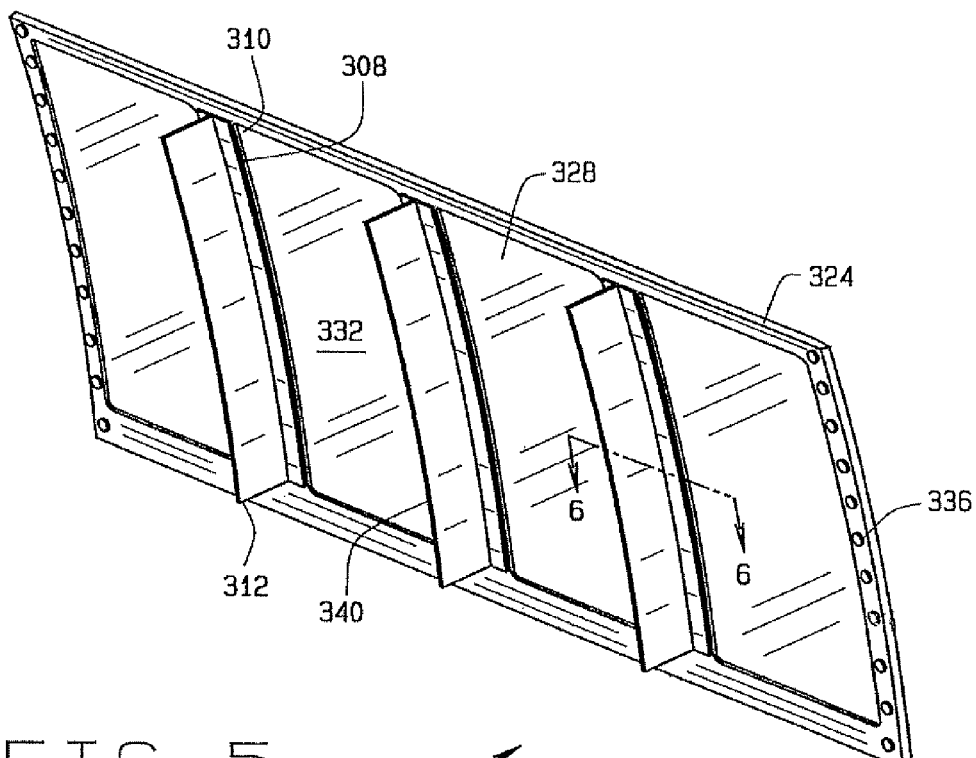
FIG. 5
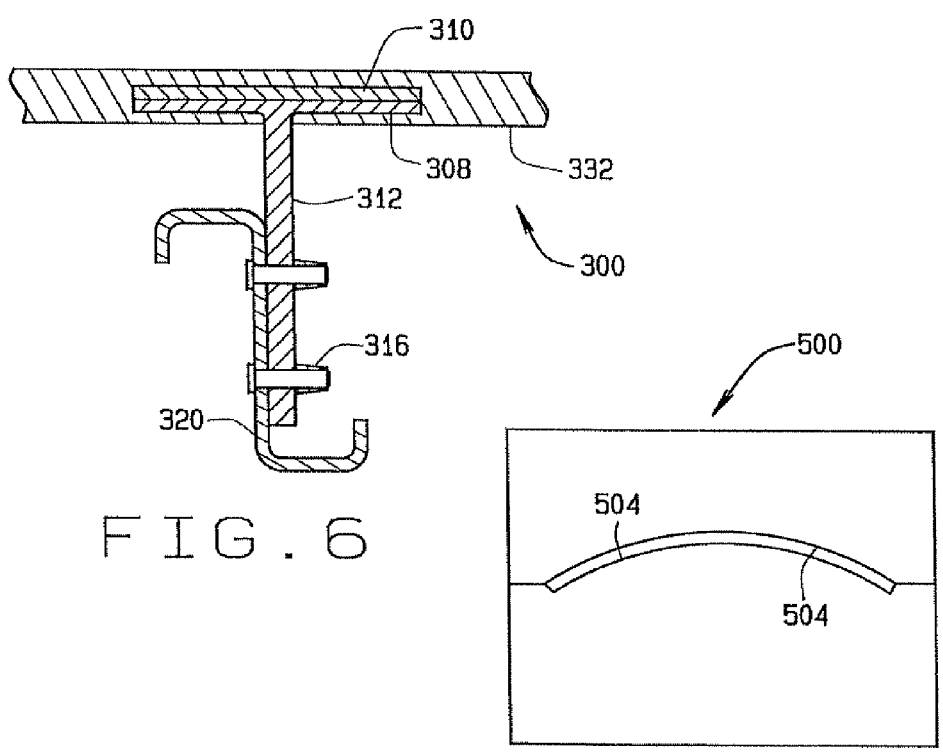
FIG. 6
FIG. 8

APPARATUS AND METHODS FOR REINFORCING A STRUCTURAL PANEL

CROSS-REFERENCE TO RELATED APPLICATIONS

This application is related to co-pending U.S. patent application Ser. No. 10/958,078 entitled "Injection-Molded Window Panel and Related Methods" and co-pending U.S. patent application Ser. No. 10/958,078 entitled "Apparatus and Methods For Installing an Aircraft Window Panel", both filed on the same date as this application and assigned to the assignee of this application, the disclosures of which are incorporated herein by reference.

FIELD OF THE INVENTION

The present invention relates to structural panels, and more particularly (but not exclusively) to reinforcing a structural skin panel for use in aircraft, trains, boats, buses and other mobile or stationary structures.

BACKGROUND OF THE INVENTION

In commercial aircraft, rows of passenger windows typically are provided along sides of the aircraft. The windows are supported within the structural skin of the aircraft and require a heavy structure of window forgings and other components to strengthen skin panels surrounding and supporting the windows. It would be desirable to provide an aircraft skin panel that can include a window but does not require the heavy structures currently used to support windows.

SUMMARY OF THE INVENTION

The present invention, in one configuration, is directed to a structural panel configured for inclusion in a structure. The panel includes a frame having one or more attachment members. A material injection-molded onto at least a portion of the frame fills one or more openings at least partly defined by the frame and defines at least a portion of a shape of the panel. The one or more attachment members are at least partially embedded in the injection-molded material for attaching the panel relative to the structure.

In another implementation, a method of making a structural panel includes combining a carbon fabric with an epoxy resin to form at least part of a frame. The frame is placed at least partly into a mold, and a polymeric material is injected into the mold at least partially around the frame.

In another configuration, a frame for inclusion in a structural panel comprises one or more composite framework elements at least partly defining one or more openings. One or more attachment members are supported by the one or more framework elements for attaching the panel relative to a structure. The frame is configured to be at least partially covered by a polymeric material injection-molded around the one or more framework elements and into the openings to form the structural panel.

In yet another configuration, a structural panel configured for inclusion in a structure comprises a frame having one or more composite framework elements. A material injection-molded onto at least a portion of the frame fills one or more openings at least partly defined by the framework elements and defines at least a portion of a shape of the panel.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 5 is a perspective view of a structural panel in accordance with one configuration of the present invention;

FIG. 6 is a sectional view, taken along the plane of line 6-6 in FIG. 5, of part of a structural panel in accordance with one configuration of the present invention;

FIG. 8 is a cross-sectional view of a closed-cavity mold.

DETAILED DESCRIPTION OF THE PREFERRED EMBODIMENTS

Figure 1:
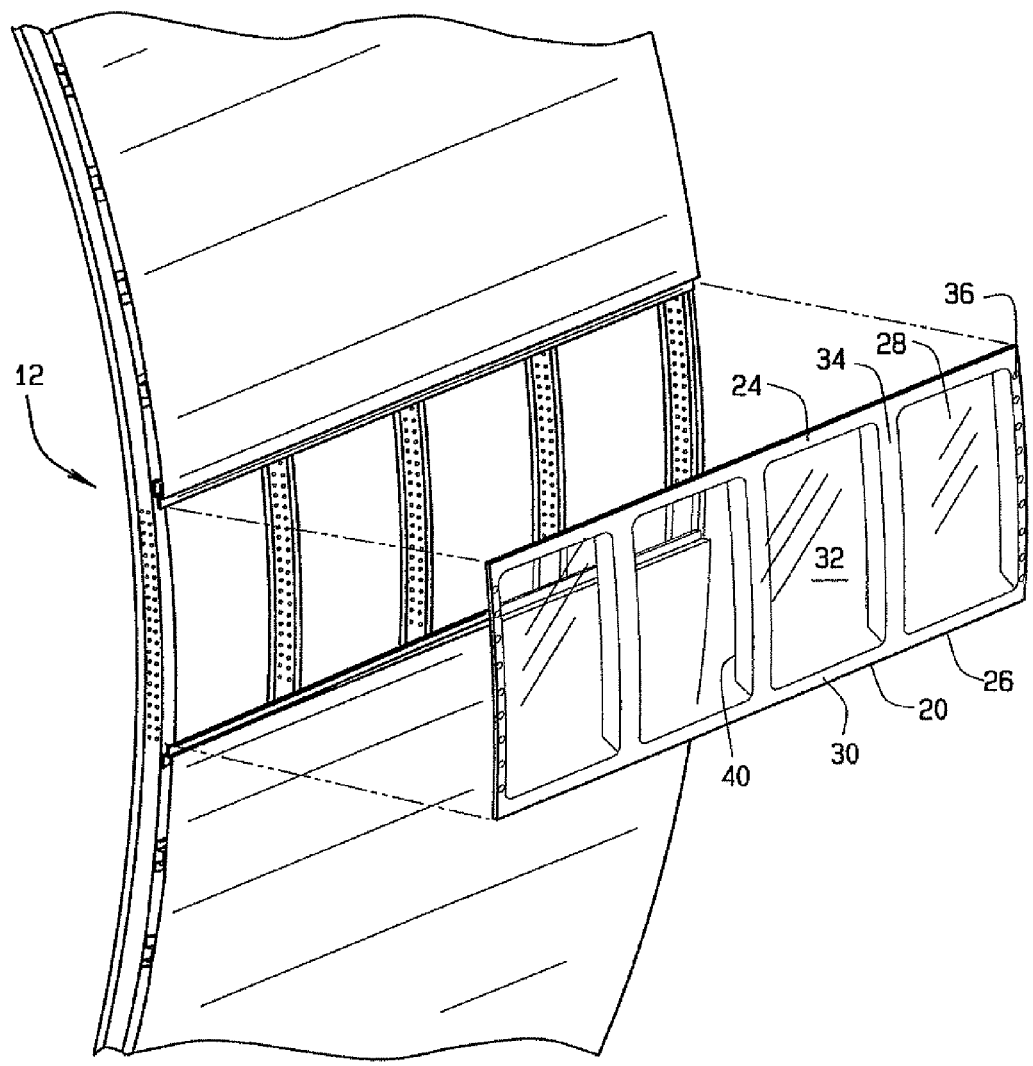
FIG. 1 is an exploded perspective view of a portion of an aircraft fuselage and a structural panel included in the fuselage portion in accordance with one configuration of the present invention.

The following description of the preferred embodiment(s) is merely exemplary in nature and is in no way intended to limit the invention, its application, or uses. For purposes of clarity, the same reference numbers may be used in the drawings to identify similar elements. Although various configurations of the present invention are described herein with reference to a structural panel for use in aircraft, the invention is not so limited. Embodiments of the invention are contemplated in connection with other types of vehicles and also in connection with stationary structures. It also should be noted that while configurations of the invention are discussed with reference to a structural panel that includes one or more windows, the invention can be practiced in connection with many kinds of structural panels. Such panels include but are not limited to those which do not have windows and/or panels which are partly or completely transparent, opaque, and/or translucent.

Referring now to FIG. 1, a structure, e.g., an aircraft fuselage in accordance with one configuration of the present invention, is partially shown and indicated generally by reference number 12. An embodiment of a structural panel 20 is configured for inclusion in the fuselage 12. More specifically, the panel 20 is configured as a fuselage skin panel. The panel 20 includes a frame 24. The frame 24 defines one or more openings 28, e.g., four openings 28 as shown in FIG. 1. The openings 28 are defined by one or more framework elements 26, including, e.g., an outer frame portion 30 and three mullions 34. The framework elements 26 are fabricated, for example, of a composite material as further described below.

It should be noted that the frame 24 could be configured in many different ways. Frame configuration could depend, for example, on how much strengthening the frame is to provide within the panel 20 and/or in which direction(s) strengthening is to be provided. Thus the framework element(s) 26 could include more than three, fewer than three, or no mullions 34. Mullion(s) could be oriented in any direction, e.g., diagonally, with respect to the panel 20 and/or could extend only partly across the panel 20. Similarly, configurations are contemplated in which the outer frame portion 30 may extend only partly around the panel 20 and/or may include two or more sub-portions that may or may not be connected with one another.

A material 32 is injection-molded onto at least a portion of the frame 24 to fill the opening(s) 28 and define at least a portion of a shape of the panel 20. The material 32 of the panel 20 is transparent and the openings 28 are configured as windows. In other structural panel configurations, however, the material 32 may be opaque and/or translucent, and windows may or may not be provided. The frame 24 may include one or more attachment members, for example, a plurality of framework attachment inserts 36 and attachment blades 40. In one configuration and as further described below, the inserts 36 and blades 40 are supported by the framework element(s) 26 and are at least partially embedded in the material 32 for attaching the panel 20 relative to the fuselage 12.

The panel 20 has a curvature that follows one or more mold lines of the fuselage 12. In other words, the panel 20 has a curvature that generally continues a surface curvature of the fuselage 12 when the panel 20 is installed relative to the fuselage 12. Thus, as can be seen in FIG. 1, the panel 20 has a convex curvature that generally continues a convex curvature of the fuselage 12. In other implementations, however, a structural panel could include curved and/or flat portions that differ in curvature and/or flatness from a structure relative to which such panel is installed.

Figure 2:
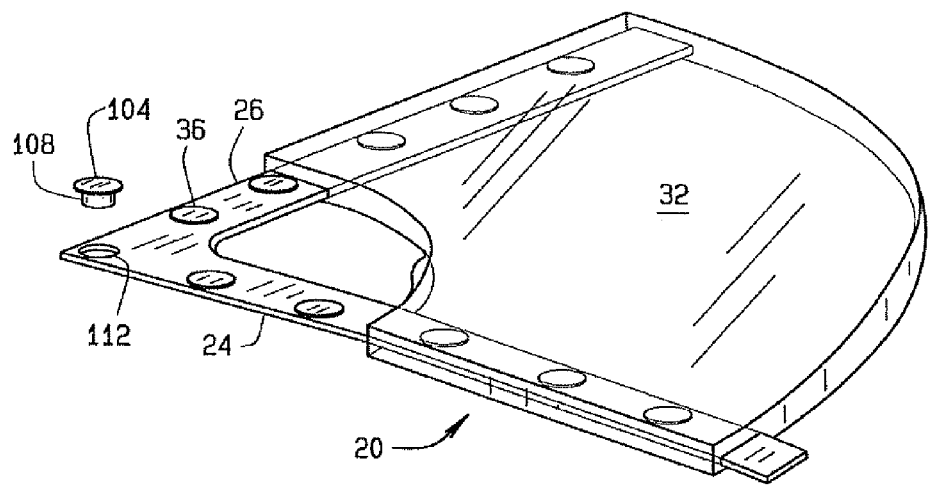
FIG. 2 is an exploded perspective view of a portion of a structural panel in accordance with one configuration of the present invention, partially cut away to expose a framework attachment insert.

A portion of the structural panel 20 is shown in greater detail in FIG. 2. The material 32 is partially cut away to expose several framework attachment inserts 36. An insert 36 includes a head 104 and shaft 108 extending from the head 104 through a hole 112 in one of the framework elements 26 of the frame 24. As further described below, the shaft 108 is positioned in the panel to receive a fastener for attaching the panel 20 relative to the fuselage 12. The attachment inserts 36 may be fabricated of metal, for example, 17-4 PH stainless steel or other suitable materials.

Figure 3:
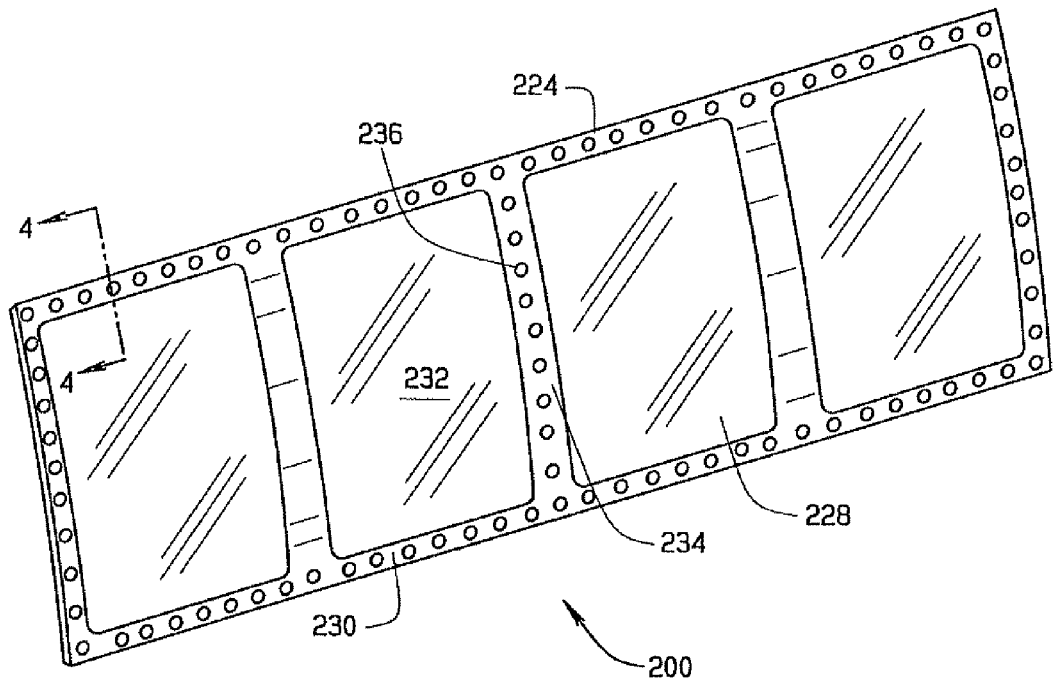
FIG. 3 is a perspective view of a structural panel in accordance with one configuration of the present invention.

Another configuration of a structural panel is indicated generally by reference number 200 in FIG. 3. A composite frame 224 defines four openings 228 which are filled with injection-molded material 232. The panel 200 may be attached relative to a structure (not shown) via a plurality of framework attachment inserts 236 in a central mullion 234 and in an outer frame portion 230.

Figure 4:
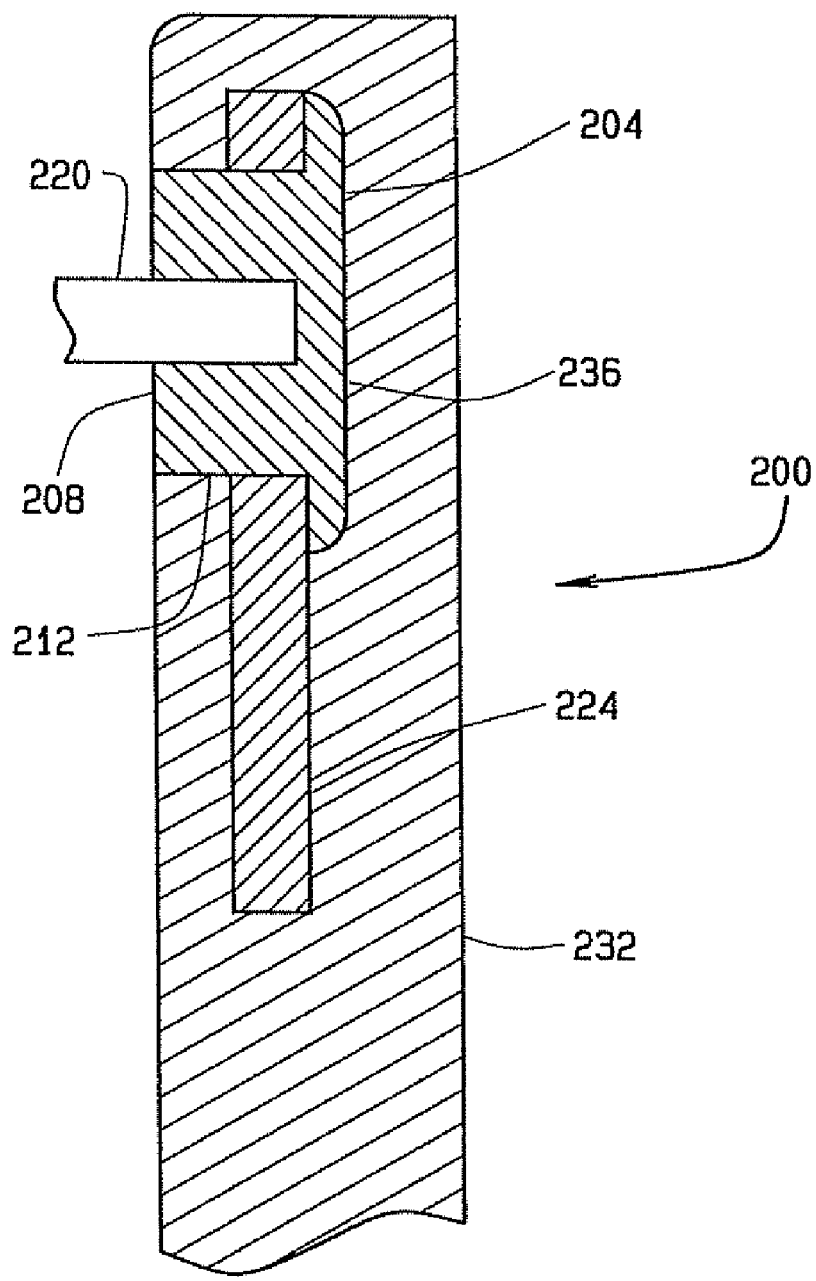
FIG. 4 is a sectional view, taken along the plane of line 4-4 in FIG. 3, of part of a structural panel in accordance with one configuration of the present invention.

A portion of the panel 200 is shown in greater detail in FIG. 4. A head 204 of the insert 236 is supported by the frame 224. A fastener 220 (a portion of which is shown in FIG. 4) is inserted into an insert shaft 208 to attach the panel 200 to the structure. In a preferred embodiment, the fastener 220 is inserted into the insert shaft 208 without penetrating the head 204 of the attachment insert.

Another configuration of a structural panel is indicated generally by reference number 300 in FIG. 5. A composite frame 324 defines four openings 328 which are filled with injection-molded material 332. The panel 300 may be attached relative to a structure (not shown in FIG. 5) via a plurality of attachment members, e.g., a plurality of framework attachment inserts 336 and a plurality of attachment blades 340. Each attachment blade 340 includes a base 308 supported by a corresponding framework element 310 of the frame 324. A blade member 312 extends from the base 308 of each attachment blade 340. An attachment blade 340 may be fabricated of a composite material, for example, from a high-modulus carbon fabric combined with a toughened epoxy resin. Additionally or alternatively, an attachment blade 340 may be fabricated of metal, for example, aluminum.

A portion of the panel 300 is shown in greater detail in FIG. 6. The base 308 is embedded with and supported by the corresponding framework element 310 of the frame 324 in the material 332. The blade 312 extends from the embedded base 308 and through the material 332 to receive one or more fasteners 316 for attaching the panel 300 relative to a structure 320, e.g., an aircraft hoop frame support member. It should be noted that other shapes and configurations of attachment blades are possible in other structural panel configurations. For example, a blade member could have a shape (including but not limited to a curved shape) to match the shape of a structural element to which the blade member is configured for attachment. In one configuration, one or more attachment blades may be embedded in a panel that does not include any framework elements. It also should be noted that elements for attaching a panel could be provided in various ways and combinations. For example, referring to FIG. 1, a structural panel could include attachment blades 40 on fewer than all mullions 34.

Figure 7:
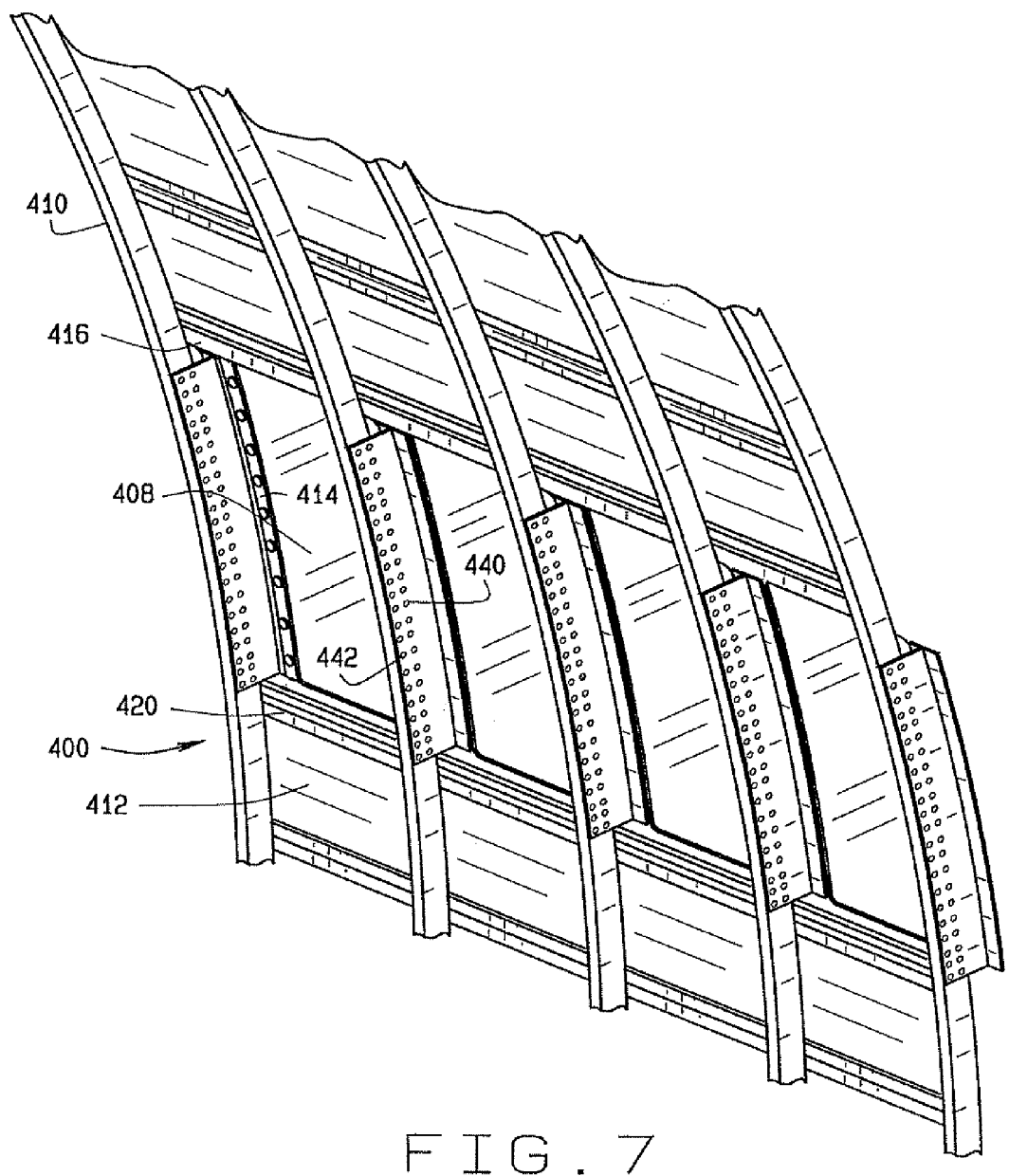
FIG. 7 is an interior perspective view of a portion of a fuselage including a structural panel in accordance with one configuration of the present invention.

FIG. 7 is a partial interior perspective view of a fuselage generally indicated by reference number 400. A structural panel 408 includes a frame 414 and is attached to a plurality of continuous hoop frame support members 410 via a plurality of attachment blades 440 and fasteners 442. The panel 408 is incorporated into a skin 412 of the fuselage 400 and fits between an upper longeron 416 and a lower longeron 420.

The frame 414 may be fabricated of metal, e.g., aluminum, and/or by combining a high-modulus carbon fabric with a toughened epoxy resin as known in the art. The structural panel 408 may be fabricated using a polymeric material, for example, aerospace grade polycarbonate or acrylic. Such materials may include but are not limited to Lexan® 103-polycarbonate, available from General Electric Company of Fairfield, Conn., and/or Plexiglas® HFI-acrylic, available from Atofina Chemicals, Inc. of Philadelphia, Pa. Although the structural panel 408 may be fabricated from polycarbonate and/or acrylic materials, chemically resistant versions of polyurethane may be used in other configurations.

A closed-cavity mold is indicated generally in FIG. 8 by reference number 500. The mold 500 includes inner surfaces 504 appropriate for producing a structural panel having a desirable shape and, in one configuration, desirable optical characteristics. The polymeric material may be injection-molded in the mold 500 under heat at about 530 F plus or minus about 20 F, and at pressure between about 1500 and 2000 psi.

In one exemplary implementation, prior to injection the polymeric material is dried at about 250 F for about four or more hours to remove essentially all water from the material. The dried material is fed into a heated cork screw extruder set at about 530 F to melt the material and ready it for injection into the mold 500. Before the material is injected, and referring to the panel configuration shown in FIG. 1, framework elements 26 and one or more attachment members, e.g., inserts 36 and/or blades 40, are positioned in the mold 500.

When the polymeric material has reached about 530 F, it is forced into an accumulator (not shown) that contains a pressure piston. For injection of the material, the pressure piston is actuated and applies between about 1500 and about 2000 psi pressure on a polymer shot that is forced into the closed mold 500. Once the material is injected, it may be held at between about 1500 and about 2000 psi pressure for a dwell time of approximately 20 minutes to allow for packing and cooling of the material in the mold 500. The mold may be held at about 350 F to allow for rapid polymer injection without freezing and to allow for polymer shrinkage that may take place during the cool-down packing cycle. After the packing cycle, the mold 500 is opened and the structural panel is removed.

Including the foregoing panel in a structure such as an aircraft can provide strength to the structure while keeping weight and costs low. Because attachment members can be embedded in the foregoing panels, little if any post-processing is needed to prepare the panels for installation. In configurations in which windows are provided, the windows can be single-pane, lighter in weight and less costly to manufacture and install than prior art aircraft window configurations.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A structural panel configured for inclusion in a structure, the panel comprising:
    a frame having a plurality of attachment members; and
    a material injection-molded onto at least a portion of the frame that encapsulates at least a portion of the frame and fills one or more openings, the openings being at least partly defined by the frame, the frame further defining at least a portion of a shape of the panel;
    wherein the attachment members are at least partially embedded in the injection-molded material for attaching the panel relative to the structure;
    the attachment members including an attachment blade having a base portion and a blade member, the base portion projecting non-parallel from the blade member, the base portion being fully embedded and completely encapsulated in the injection-molded material, and a portion of the blade member being encapsulated within the injection-molded material;
    the blade member including a plurality of openings formed therein to receive a plurality of fasteners along the blade member for attaching the structural panel relative to the structure.

2. The panel of claim 1, wherein the frame further comprises one or more framework elements at least partially embedded in the injection-molded material and that support the attachment members.

3. The panel of claim 1, wherein the injection-molded material comprises a transparent material.

4. The panel of claim 1, wherein the attachment members further comprise a framework attachment insert having a head and a shaft extending from the head through a hole in the frame, the shaft positioned in the panel to receive a fastener for attaching the panel relative to the structure.

5. The panel of claim 4, wherein the framework attachment insert comprises a metallic material.

6. The panel of claim 1, comprising a curvature that essentially continues a curvature of the structure when the panel is attached relative to the structure.

7. The panel of claim 1, wherein the frame comprises at least one of a composite material and a metallic material.

8. A frame for inclusion in a structural panel comprising:
    a plurality of framework elements made of a composite material, the framework elements at least generally defining an overall panel shape and defining one or more openings; and
    a plurality of attachment members supported by the framework elements for attaching the panel relative to a structure, the attachment members including a framework attachment insert having a head and a shaft substantially concentric with and extending from the head through a hole in one of the framework elements to receive a fastener in the shaft;
    the attachment members further including an attachment blade having an elongated base supported by one of the framework elements and a blade member extending from and generally normal to the base, the supporting framework element, and the overall panel shape, the elongated base and the blade member together forming a T-shaped component;
    wherein the frame is configured to be at least partially covered by a polymeric material injection-molded around the one or more framework elements and into the openings to form the structural panel;
    and wherein the elongated base is completely encapsulated within the polymeric material, and wherein a portion of the blade member is encapsulated within the polymeric material.

9. The frame of claim 8, wherein the framework attachment insert comprises a metallic material.

10. The frame of claim 8, wherein the composite material comprises a carbon fabric.

11. The frame of claim 10, wherein the attachment blade comprises at least one of a composite material and a metallic material.

12. The frame of claim 8, configured with the polymeric material to form a panel having at least one transparent portion.

13. The frame of claim 8, wherein the frame at least partly defines one or more windows when covered by the polymeric material.

14. A structural panel configured for inclusion in a structure, the panel comprising:
    a frame having one or more composite framework elements; and
    a material injection-molded onto at least a portion of the frame that fills one or more openings at least partly defined by the framework elements and defines at least a portion of a shape of the panel, the frame being completely encapsulated within the material during an injection-molding operation and the openings defining transparent sections forming windows;
    the frame further including a plurality of attachment members at least partly embedded in the injection-molded material and supported by the one or more composite framework elements;
    the attachment members including:
        an attachment blade having a base, the base being fully embedded in the injection-molded material so as to be encapsulated therein during the injection-molding operation, and a blade member substantially co-extensive with the base to form a T-shape with the base, a portion of the blade member being encapsulated within the injection-molded material during the injection-molding operation, and a major portion of the blade member extending outwardly from the injection-molded material to receive a plurality of fasteners along the blade member; and
        a framework attachment insert having a head and a shaft extending from the head through a hole in one of the one or more framework elements, the shaft configured to be at least partially penetrated by a fastener.

* * * * *